(12) United States Patent
Osuki et al.

(10) Patent No.: US 8,137,613 B2
(45) Date of Patent: Mar. 20, 2012

(54) AUSTENITIC STAINLESS STEEL WELDED JOINT AND AUSTENITIC STAINLESS STEEL WELDING MATERIAL

(75) Inventors: Takahiro Osuki, Nishinomiya (JP); Kazuhiro Ogawa, Nishinomiya (JP); Hirokazu Okada, Kobe (JP); Masaaki Igarashi, Sanda (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 342 days.

(21) Appl. No.: 12/458,507

(22) Filed: Jul. 14, 2009

(65) Prior Publication Data
US 2010/0062279 A1   Mar. 11, 2010

Related U.S. Application Data

(63) Continuation of application No. PCT/JP2007/073825, filed on Dec. 11, 2007.

(30) Foreign Application Priority Data

Jan. 15, 2007   (JP) ................. 2007-005326

(51) Int. Cl.
   *C22C 38/40* (2006.01)
   *C22C 38/44* (2006.01)
   *C22C 38/50* (2006.01)
   *C22C 38/42* (2006.01)
   *C22C 19/03* (2006.01)
   *C22C 30/00* (2006.01)

(52) U.S. Cl. ............. 420/42; 420/40; 420/46; 420/47; 420/45; 420/43; 420/584.1; 420/443; 428/685; 428/680; 219/146.23

(58) Field of Classification Search ............ 420/40, 420/42, 584.1, 43, 45–47, 443; 428/680, 428/685; 219/146.23
See application file for complete search history.

(56) References Cited

U.S. PATENT DOCUMENTS 7,731,895 B2 *   6/2010   Okada et al. ............ 420/42

FOREIGN PATENT DOCUMENTS

| CA | 2420796 | 9/2003 |
|---|---|---|
| CA | 2425398 | 10/2003 |
| CA | 2464856 | 10/2004 |
| CA | 2528743 | 12/2004 |
| JP | 37-17113 | 10/1937 |
| JP | 62-267454 | 11/1987 |
| JP | 2003-82441 | 3/2003 |
| JP | 2005-23353 | 1/2005 |
| JP | 2008-30076 | 2/2008 |
| WO | 2006/106944 | 10/2006 |

OTHER PUBLICATIONS

Machine-English translation of Japanese patent 2000-328198, Senba Mitsuyuki, Nov. 28, 2000.*
Y. Arata et al., "Solidification Crack Susceptibility in Weld Metals of Fully Austenitic Stainless Steels (Report II)", *Transactions of JWRI* vol. 6, No. 1, 1977, pp. 105-116.

* cited by examiner

*Primary Examiner* — Deborah Yee
(74) *Attorney, Agent, or Firm* — Clark & Brody

(57) ABSTRACT

An austenitic stainless steel welded joint, whose base metal and weld metal each comprises, by mass percent, C: not more than 0.3%, Si: not more than 2%, Mn: 0.01 to 3.0%, P: more than 0.04% to not more than 0.3%, S: not more than 0.03%, Cr: 12 to 30%, Ni: 6 to 55%, rare earth metal(s): more than 0.2% to not more than 0.6%, sol. Al: 0.001 to 3% and N: not more than 0.3%, with the balance being Fe and impurities, and satisfies the formula of $(Cr+1.5 \times Si+2 \times P)/(Ni+0.31 \times Mn+22 \times C+14.2 \times N+5 \times P) < 1.388$, in spite of having a high P content and showing the fully austenitic solidification, has excellent resistance to the weld solidification cracking. Therefore, the said austenitic stainless steel welded joint can be widely used in such fields where a welding fabrication is required. Each element symbol in the above formula represents the content by mass percent of the element concerned.

4 Claims, No Drawings

AUSTENITIC STAINLESS STEEL WELDED JOINT AND AUSTENITIC STAINLESS STEEL WELDING MATERIAL

This application is a continuation of the international application PCT/JP2007/073825 filed on Dec. 11, 2007, the entire content of which is herein incorporated by reference.

TECHNICAL FIELD

The present invention relates to an austenitic stainless steel welded joint and an austenitic stainless steel welding material. More particularly, the present invention relates to an austenitic stainless steel welded joint and an austenitic stainless steel welding material, which not only can be widely applied to steel pipes, steel plates and so on in such fields where high temperature strength and corrosion resistance are required, but also have excellent weld solidification cracking resistance, in spite of a P content as high as more than 0.04%.

BACKGROUND ART

Austenitic stainless steels, for example, such as SUS 304, SUS 316, SUS 310S and others, which are regulated in JIS G 4304 (2005), are materials containing Cr and Ni as main alloying elements, and they are excellent in corrosion resistance.

However, in the present state of affairs, restrictions are imposed on the contents of the respective constituent elements for any of the austenitic stainless steels. In particular, the content of P, which is an impurity element, is generally limited to a level not more than 0.045%. Furthermore, the P content in the welding materials to be used for welding these steels, for example in "austenitic stainless steel wire rods for welding" described in JIS G 4316 (1991), is limited to a further lower level, namely not more than 0.030%.

On the other hand, it is known that when P, which is essentially an impurity element is contained at a high concentration, it contributes toward precipitation hardening by making $M_{23}C_6$ carbides finer, hence leads to improvements in creep strength.

Therefore, for example, the Patent Documents 1 to 3 propose techniques in which P is allowed to be contained in high concentrations.

That is to say, the Patent Document 1 discloses "an improved heat resisting steel for valves". The said steel contains 0.05 to 0.40% of P which produces a precipitation hardening-promoting effect, and therefore the high temperature-strength thereof is markedly increased.

The Patent Document 2 discloses "an austenitic stainless steel excellent in creep strength" which is added 0.03 to 0.08% of P to a very low carbon austenitic stainless steel having a C content of not higher than 0.01%.

Further, the Patent Document 3 discloses "an austenitic stainless steel" which contains 0.05 to 0.30% of P and is excellent in high temperature strength.

Thus, when P is contained at high concentrations, it contributes toward rendering $M_{23}C_6$ carbides finer and can increase the creep strength.

However, the increase of the P content in those austenitic stainless steels, in particular which show fully austenitic solidification such as SUS 310S, causes a deterioration of weldability. That is to say, the incidence of cracking, which occurs when the strain resulting from the solidification shrinkage or thermal shrinkage exceeds the deformability of the weld metal, in particular, in the stage which is close to the end of the weld solidification process in which a filmy liquid phase is present mainly along the crystal grain boundaries (hereinafter such cracking is referred to as "weld solidification cracking"), is increased.

Therefore, in particular, in the case of austenitic stainless steels which show the fully austenitic solidification, restrictions are imposed on the increased P contents from the weldability viewpoint, for example in the Non-Patent Document 1, it is shown that the P content should be rigidly restricted.

The technique disclosed in the Patent Document 1 is indeed suited for such fields of application as exhaust valves and stop valves, but does not take into consideration the marked increase in susceptibility to the weld solidification cracking resulting from the increase of P content. Therefore, it is very difficult to use the steel disclosed therein as a steel product requiring welding; in particular, the steel cannot be used in austenitic stainless steel products which show the fully austenitic solidification.

In the Patent Document 2, it explains that only the upper limit of the P content should be set to 0.08% so that the weldability may not be impaired; there is no description at all of what should be taken into consideration for reducing the susceptibility to the weld solidification cracking in such an austenitic stainless steel which shows the fully austenitic solidification in the stage that the austenite solidifies as a primary crystal. Therefore, the austenitic stainless steel disclosed in the Patent Document 2 cannot be used, in particular, in an austenitic stainless steel product which shows the fully austenitic solidification.

The technique disclosed in the Patent Document 3 can indeed be applied widely in those fields where steel pipes, steel plates, steel bars, steel castings, steel forgings and the like which are required to have high temperature strength and corrosion resistance. However, no sufficient study has been made of the increased P content-due weld solidification cracking in such austenitic stainless steels which show the fully austenitic solidification. Therefore, when the austenitic stainless steel disclosed in the Patent Document 3 is used as an austenitic stainless steel product which shows the fully austenitic solidification, it is not always possible to ensure excellent resistance to the weld solidification cracking.

Patent Document 1: Japanese Examined Patent Publication No. 37-17113

Patent Document 2: Japanese Unexamined Patent Publication No. 62-267454

Patent Document 3: International Publication WO 2006/106944

Non-Patent Document 1: Y. Arata, F. Matsuda and S. Katayama: Transactions of JWRI, Vol. 6-1 (1977), pp. 105 to 116

DISCLOSURE OF THE INVENTION

Problems to be Solved by the Invention

It is the objective of the present invention to provide an austenitic stainless steel welded joint and an austenitic stainless steel welding material which, in spite of their having a high P content and showing a fully austenitic solidification, are excellent in weldability and, in particular, in weld solidification cracking resistance.

Means for Solving the Problems

The present inventors made various investigations for the purpose of preventing austenitic stainless steels, which contain a high concentration of P, the content of which has so far been restricted because of its causing marked increases in susceptibility to weld solidification cracking, in spite of the knowledge that it exerts good effects on such characteristics of steel materials as improvements in creep strength, and which show the fully austenitic solidification, from undergoing weld solidification cracking and also of providing them with excellent weldability.

As mentioned above, the said weld solidification cracking occurs when the liquid phase, which exists among dendrites during the weld solidification, remains in a filmy form at a low temperature, and cannot withstand the applied stress.

An increased P content results in an increase in susceptibility to the weld solidification cracking and thus increases the occurrence of weld solidification cracking. This is due to P being markedly concentrated in the liquid phase during solidification and therefore greatly lowers the solidification completion temperature of the liquid phase; thus the liquid phase remains at a low temperature.

Therefore, various investigations have been made to reduce the occurrence of the weld solidification cracking due to P which is contained as an impurity element. However, P is hardly soluble in the austenite; and therefore it markedly increases the susceptibility to the weld solidification cracking, not only in the case that an austenite solidifies as a primary crystal, but also in the case that a fully austenitic solidification occurs.

Consequently, in the present state of affairs, the restraints are imposed on the P content in stainless steels which show the fully austenitic solidification. For example, in the case of SUS 310S which is a steel species representative of the above-mentioned austenitic stainless steels showing the fully austenitic solidification and is regulated in JIS G 4304 (2005), the P content is restricted to not more than 0.045%. For the welding material to be used in welding the same, the P content is restricted to a lower level, that is to say, not more than 0.030% in JIS G 4316 (1991) from the viewpoint of the said weld solidification cracking.

However, as mentioned above, P is known to be an element which improves the creep strength and so on. Therefore, if a technique is obtained by which the solidification cracking susceptibility of stainless steels which show the fully austenitic solidification can be reduced, such a technique will be expected to contribute toward rendering austenitic stainless steels, for example, which is used as raw materials of boilers and chemical plants used in high temperature environments, markedly improved functional materials, that is to say, materials reliably having excellent high temperature strength, microstructural stability and so on.

Therefore, the present inventors made investigations concerning the possibility of reducing the weld solidification cracking susceptibility of austenitic stainless steels containing P at a high concentration and showing the fully austenitic solidification.

First, the present inventors considered that by fixing P, which is not soluble in austenite during the weld solidification and therefore is significantly concentrated in the liquid phase, as phosphides and causing them to crystallize out from the liquid phase, even in the case that the fully austenitic solidification, which causes the highest solidification cracking susceptibility, the liquid phase, which has a great influence on the solidification cracking susceptibility, can disappear early. Thus, they searched for elements which have a great affinity for P and a high ability to fix P.

As a result, it was found that each of the rare earth metals (hereinafter also referred to as "REM") is an element which has a great affinity for P, that is to say, an element which has a very high ability to fix P.

The term "REM" is a generic name for a total of 17 elements including Sc, Y and the lanthanoid.

Therefore, the present inventors then made up a microsegregation calculation model taking the crystallization of phosphides into consideration, and estimated the content of REM, which is required to overcome the malignant influence of P, on the solidification cracking susceptibility.

As a result, it was revealed that when the content of REM is within the range from more than 0.2% to not more than 0.6%, it is sometimes possible to promote the early crystallization of the liquid phase and lower the solidification cracking susceptibility.

The above-mentioned content of REM means the content of one element or the total content of two or more elements among the REM.

Furthermore, the present inventors actually prepared various austenitic stainless steels, which contain 0.1% of P by mass % and show the fully austenitic solidification, and then made detailed investigations concerning the effects of the content of REM on the weld solidification cracking susceptibility.

As a result, it was found that, in the case of high-P austenitic stainless steels, whose composition is designed so as to show the fully austenitic solidification by satisfying the following formula (1) or formula (2), in which the effect of P is taken into consideration, the occurrence of the weld solidification cracking can be inhibited under the condition of the fully austenitic solidification, even when the P content is as high as 0.1%, provided that the steels contain the appropriate amount of REM as estimated by numerical calculations, that is to say, "more than 0.2% to not more than 0.6%".

$$(Cr+1.5\times Si+2\times P)/(Ni+0.31\times Mn+22\times C+14.2\times N+5\times P) < 1.388 \quad (1),$$

$$(Cr+1.5\times Si+2\times Nb+Ti+2\times P)/(Ni+0.31\times Mn+22\times C+14.2\times N+Cu+5\times P) < 1.388 \quad (2);$$

In the formulas (1) and (2), each element symbol represents the content by mass percent of the element concerned.

The present invention has been accomplished on the basis of the above-described findings. The main points of the present invention are the austenitic stainless steel welded joints shown in the following (1) and (2), and the austenitic stainless steel welding materials shown in the following (3) and (4).

(1) An austenitic stainless steel welded joint, whose base metal and weld metal each comprises, by mass percent, C: not more than 0.3%, Si: not more than 2%, Mn: 0.01 to 3.0%, P: more than 0.04% to not more than 0.3%, S: not more than 0.03%, Cr: 12 to 30%, Ni: 6 to 55%, rare earth metal(s): more than 0.2% to not more than 0.6%, sol. Al: 0.001 to 3% and N: not more than 0.3%, with the balance being Fe and impurities, and the following formula (1) is satisfied:

$$(Cr+1.5\times Si+2\times P)/(Ni+0.31\times Mn+22\times C+14.2\times N+5\times P) < 1.388 \quad (1);$$

In the formula (1), each element symbol represents the content by mass percent of the element concerned.

(2) An austenitic stainless steel welded joint according to the above (1), whose base metal and weld metal each further contains, by mass percent, one element or two or more elements selected from the first group and/or the second group given below in lieu of a part of Fe and, further, the following formula (2) is satisfied:

$$(Cr+1.5\times Si+2\times Nb+Ti+2\times P)/(Ni+0.31\times Mn+22\times C+14.2\times N+Cu+5\times P) < 1.388 \quad (2);$$

In the formula (2), each element symbol represents the content by mass percent of the element concerned.

First group: one or two or more of Mo: not more than 5%, W: not more than 10%, provided that Mo+(W/2): not more than 5%, Ti: not more than 3%, Nb: not more than 1.5%, Ta:

not more than 8%, V: not more than 1.5%, Zr: not more than 1%, Hf: not more than 1%, B: not more than 0.03%, Cu: not more than 3% and Co: not more than 5%; and Second group: one or both of Ca: not more than 0.05% and Mg: not more than 0.05%.

(3) An austenitic stainless steel welding material, which comprises, by mass percent, C: not more than 0.3%, Si: not more than 2%, Mn: 0.01 to 3.0%, P: more than 0.04% to not more than 0.3%, S: not more than 0.03%, Cr: 12 to 30%, Ni: 6 to 55%, rare earth metal(s): more than 0.2% to not more than 0.6%, sol. Al: 0.001 to 3% and N: not more than 0.3%, with the balance being Fe and impurities, and the following formula (1) is satisfied:

$$(Cr+1.5\times Si+2\times P)/(Ni+0.31\times Mn+22\times C+14.2\times N+5\times P) < 1.388 \quad (1);$$

In the formula (1), each element symbol represents the content by mass percent of the element concerned.

(4) An austenitic stainless steel welding material according to the above (3), which further comprises, by mass percent, one element or two or more elements selected from the first group and/or the second group given below in lieu of a part of Fe and, further, the following formula (2) is satisfied:

$$(Cr+1.5\times Si+2\times Nb+Ti+2\times P)/(Ni+0.31\times Mn+22\times C+14.2\times N+Cu+5\times P) < 1.388 \quad (2);$$

In the formula (2), each element symbol represents the content by mass percent of the element concerned.

First group: one or two or more of Mo: not more than 5%, W: not more than 10%, provided that Mo+(W/2): not more than 5%, Ti: not more than 3%, Nb: not more than 1.5%, Ta: not more than 8%, V: not more than 1.5%, Zr: not more than 1%, Hf: not more than 1%, B: not more than 0.03%, Cu: not more than 3% and Co: not more than 5%; and Second group: one or both of Ca: not more than 0.05% and Mg: not more than 0.05%.

In the following, the above-mentioned inventions (1) and (2) related to the austenitic stainless steel welded joints and the inventions (3) and (4) related to the austenitic stainless steel welding materials are referred to as "the present invention (1)" to "the present invention (4)", respectively, or collectively referred to as "the present invention".

The term "rare earth metals (REM)" in the present invention is a generic name for a total of 17 elements including Sc, Y and the lanthanoid, and the above-mentioned content of REM means the content of one element or the total content of two or more elements among the REM.

Effects of the Invention

The austenitic stainless steel welded joints of the present invention, in spite of having a high P content and showing the fully austenitic solidification, can inhibit the occurrence of the weld solidification cracking. Therefore they can be widely used in such fields where a welding fabrication is required. The austenitic stainless steel welding materials of the present invention are best suited for producing the above-mentioned austenitic stainless steel welded joints.

BEST MODES FOR CARRYING OUT THE INVENTION

In the following, the reasons for restricting the contents of the component elements of the austenitic stainless steel welded joints and welding materials in the present invention are described in detail. In the following description, the symbol "%" for the content of each element means "% by mass".

C: not more than 0.3%

C is an element which stabilizes austenite and is also effective for enhancing the tensile strength and/or creep strength. However, when the content of C is excessive, in particular when it exceeds 0.3%, the susceptibility to the weld solidification cracking increases and, at the same time, the corrosion resistance becomes markedly deteriorated. Therefore, the content of C is set to not more than 0.3%.

In order to ensure the above-mentioned effects of C, that is to say, the effects of stabilizing austenite and enhancing tensile strength and/or creep strength, the lower limit of the C content is preferably 0.05%.

In the case where excellent corrosion resistance is required, the resistance to intergranular corrosion can be improved by reducing the content of C; hence such conditioned austenitic stainless steels can be used in high temperature regions. Therefore, in a case where the austenitic stainless steels are used in high temperature regions and high corrosion resistance is required, the upper limit of the C content is preferably lowered.

Therefore, from the viewpoint of stabilization for austenite, ensuring of tensile strength and/or creep strength and ensuring of excellent corrosion resistance, the content of C is preferably more than 0.06% to not more than 0.25%. More preferably, the content of C is 0.07 to 0.15%.

Si: not more than 2%

Si is an element having a deoxidizing effect in the step of melting the austenitic stainless steels and further is effective in increasing oxidation resistance, steam oxidation resistance and so on. In order to obtain these effects, it is preferable to contain Si of not less than 0.1%. However, when the content of Si becomes excessive, in particular when it exceeds 2%, the susceptibility to the weld solidification cracking markedly increases and, since Si is a ferrite-stabilizing element, it becomes difficult to stably cause the fully austenitic solidification to form a single phase of austenite.

Therefore, the content of Si is set to not more than 2%. More preferably, the content of Si is not more than 1%.

Mn: 0.01 to 3%

Mn is an element which stabilizes austenite and is also effective in preventing the hot working brittleness due to S which is contained as an impurity in the austenitic stainless steels and, in addition, Mn has a deoxidizing effect in the step of melting the steels. In order to obtain such effects, a content of Mn not less than 0.01% is necessary. However, if the content of Mn exceeds 3%, it promotes the precipitation of such intermetallic compounds as the σ phase and, in the case where austenitic stainless steels are used in a high temperature environment, a decrease in toughness and/or ductility due to the deterioration of the microstructural stability at high temperatures occurs. Therefore, the content of Mn is set to 0.01 to 3%. The content of Mn is more preferably 0.05 to 2% and further more preferably 0.1 to 1.5%.

P: more than 0.04% to not more than 0.3%

P is known to be an element which markedly increases susceptibility to the weld solidification cracking. In the case of the fully austenitic solidification, in particular, the said malignant influence becomes more markedly. Therefore, restraints have so far been imposed on the content of P. However, when P is contained at a level of more than 0.04%, P contributes toward fine carbide precipitation and produces improved material characteristics such as the creep strength and so on in the case where the austenitic stainless steels are used in a high temperature environment.

In accordance with the present invention, the malignant influence of P on the increase in susceptibility to the weld solidification cracking under the fully austenitic solidification is counteracted by containing an amount of the REM which is mentioned later herein. However, when the P content is too excessive, in particular when it exceeds 0.3%, a malignant influence such as deterioration of creep ductility and so on cannot be avoided.

Therefore, the content of P is set to more than 0.04% to not more than 0.3%. The content of P is more preferably more than 0.05% to not more than 0.25%, and further more preferably more than 0.08% to not more than 0.2%.

S: not more than 0.03%

S is an impurity element coming from raw materials, for example, in the step of melting the austenitic stainless steels. A high content of S causes the deterioration of corrosion resistance and it also deteriorates the hot workability and weldability; in particular, when the content of S exceeds 0.03%, the corrosion resistance, workability and weldability markedly deteriorate. Therefore, the content of S is set to not more than 0.03%. It is desirable that the S content be reduced as low as possible. Therefore, the content of S is preferably not more than 0.01% and more preferably not more than 0.005%.

Cr: 12 to 30%

Cr is an essential element for forming a thin oxide film on the surface of the austenitic stainless steel to thereby ensure oxidation resistance, steam oxidation resistance and high temperature corrosion resistance and so on. In order to obtain the above-mentioned effects, it is necessary that the Cr content be not less than 12%. As the content of Cr increases, the corrosion resistance is improved. However, since Cr is a ferrite-stabilizing element, when the content of Cr exceeds 30%, the austenitic microstructure becomes unstable, readily allowing the formation of such intermetallic compounds as the σ phase or the α-Cr phase, and so deterioration of toughness and/or high temperature strength occurs. Therefore, the content of Cr is set to 12 to 30%. The content of Cr is more preferably 15 to 28% and most preferably 18 to 26%.

Ni: 6 to 55%

Ni is an essential element for ensuring a stable austenitic microstructure and the necessary minimum content of Ni is determined by the contents of elements contained in the austenitic stainless steels such as Cr, Mo, W, Nb and the like, which are the ferrite-forming elements, and Mn, C, N and so on, which are the austenite-forming elements.

In the present invention, it is necessary that the content of Cr be not less than 12% and, if the Ni content is lower than 6% relative to the Cr content, it becomes difficult to cause the fully austenitic solidification to form a single phase of austenite. On the other hand, if the content of Ni exceeds 55%, the concentration of P, which is hardly soluble in austenite, in the liquid phase becomes markedly, and an increase of susceptibility to the weld solidification cracking is caused. Therefore, the content of Ni is set to 6 to 55%. The content of Ni is more preferably 10 to 40% and further more preferably more than 15% to not more than 30%.

REM: more than 0.2% to not more than 0.6%

REM is one of the most important elements in the present invention. REM has a great affinity for P, so that even when the P content exceeds the limit level employed in the past restrictions, the REM binds to P which is concentrated in the liquid phase during the weld solidification, and can crystallize out as a phosphide. And therefore, REM promotes the early disappearance of the liquid phase, whereby the susceptibility to the weld solidification cracking can be markedly reduced.

In order to obtain the above-mentioned effect of REM within the P content range already mentioned hereinabove, it is necessary that the content of REM be more than 0.2%. On the other hand, if the content of REM exceeds 0.6%, the effect of causing an early disappearance of the liquid phase as a result of crystallization of the REM-phosphides will decrease markedly and the susceptibility to the weld solidification cracking may increase. In addition, the amount of REM-phosphides, which crystallized out from the liquid phase, increases. And thus there is a marked deterioration of hot workability.

Therefore, the content of REM is set to more than 0.2% to not more than 0.6%. The content of REM is more preferably more than 0.3% to not more than 0.6%.

Sol. Al: 0.001 to 3%

Al has a deoxidizing effect in the step of the melting of the austenitic stainless steels. In order to obtain this effect, it is necessary that the content of Al as sol.Al("acid-soluble Al") be not less than 0.001%. However, when the content of Al as sol.Al exceeds 3%, the precipitation of such intermetallic compounds as the a phase is promoted during the use at high temperatures, leading to a deterioration of toughness, ductility and high temperature strength. Therefore, the content of sol.Al is set to 0.001 to 3%. The content of sol.Al is more preferably 0.005 to 2% and further more preferably 0.01 to 1%.

N: not more than 0.3%

N is an element which stabilizes austenite and is also effective in enhancing the creep strength. However, when the content of N becomes excessive, it causes a deterioration of hot workability and cold workability. In particular, when the content of N exceeds 0.3%, the hot workability and cold workability markedly deteriorate. Therefore, the content of N is set to not more than 0.3%. The content of N is more preferably not more than 0.1% and further more preferably not more than 0.03%.

The value of $(Cr+1.5 \times Si+2 \times P)/(Ni+0.31 \times Mn+22 \times C+14.2 \times N+5 \times P)$: less than 1.388

The austenitic stainless steel, which comprises the above-mentioned elements C to N within the respective content ranges, with the balance being Fe and impurities, if it has a value of "$(Cr+1.5 \times Si+2 \times P)/(Ni+0.31 \times Mn+22 \times C+14.2 \times N+5 \times P)$" which is less than 1.388, that is to say, satisfies the formula (1), can reliably and stably prevent the undergoing of the weld solidification cracking even when it shows the fully austenitic solidification to form a single phase of austenite.

From the reasons mentioned above, the austenitic stainless steel welded joint according to the present invention (1) is defined as the one whose base metal and weld metal, each comprising the above-mentioned elements C to N within their respective content ranges, with the balance being Fe and impurities, and further satisfying the said formula (1).

From the same reasons, the austenitic stainless steel welding material according to the present invention (3) is defined as the one comprising the above-mentioned elements C to N within their respective content ranges, with the balance being Fe and impurities, and further satisfies the said formula (1).

The austenitic stainless steel welded joint of the present invention (1) may further contain, in lieu of a part of Fe in its base metal and weld metal, and also the austenitic stainless steel welding material of the present invention (3) may further contain, in lieu of a part of Fe, according to need, one element or two or more elements selected from the first group and/or the second group given below:

First group: one or two or more of Mo: not more than 5%, W: not more than 10%, provided that Mo+(W/2): not more than 5%, Ti: not more than 3%, Nb: not more than 1.5%, Ta: not more than 8%, V: not more than 1.5%, Zr: not more than 1%, Hf: not more than 1%, B: not more than 0.03%, Cu: not more than 3% and Co: not more than 5%; and Second group: one or both of Ca: not more than 0.05% and Mg: not more than 0.05%.

That is to say, one or two or more of the first group and/or the second group of elements mentioned above may be contained as optional elements.

The above-mentioned optional elements will be explained below.

First group: one or two or more of Mo: not more than 5%, W: not more than 10%, provided that Mo+(W/2): not more than 5%, Ti: not more than 3%, Nb: not more than 1.5%, Ta: not more than 8%, V: not more than 1.5%, Zr: not more than 1%, Hf: not more than 1%, B: not more than 0.03%, Cu: not more than 3% and Co: not more than 5%

Each of Mo, W, Ti, Nb, Ta, V, Zr, Hf, B, Cu and Co being elements of the first group, and if added, has the effect of enhancing the high temperature strength. In order to obtain this effect, the said elements may be added to the steels and thereby contained therein. In the following, the elements, which are in the first group, are described in detail.

Mo: not more than 5% and W: not more than 10%, provided that Mo+(W/2): not more than 5%

Mo and W are effective elements to improve the high temperature strength. Mo also has an effect for enhancing the pitting resistance. In order to ensure the above-mentioned effects, the content of Mo or W, when each is included singly, is preferably not less than 0.05%. When both the elements are combined and included, the total content of Mo+(W/2) is preferably not less than 0.05%. However, when Mo and W are included singly at a content exceeding 5% and 10%, respectively, or when Mo and W are included in combination at a content exceeding 5% as expressed in terms of Mo+(W/2), the said effects are saturated and the alloying cost increases. In addition, since both Mo and W are elements which stabilize ferrite, the formation of such intermetallic compounds as the a phase and so on is induced; hence deterioration of microstructural stability and hot workability occurs. Therefore, if Mo and W are included, the contents thereof are set as follows; Mo: not more than 5% and W: not more than 10%, provided that Mo+(W/2): not more than 5%. When either Mo or W are included singly, the content of Mo is preferably 0.05 to 5% while the content of W is preferably 0.05 to 10% and, when both the elements are combined and included, the total content of Mo+(W/2) is preferably 0.05 to 5%.

As mentioned above, both Mo and W are ferrite-forming elements. Therefore, when either Mo or W are included singly, the content of Mo is more preferably not less than 0.05% to less than 4% while the content of W is more preferably not less than 0.05% to less than 4% in order to stabilize the austenitic microstructure.

Ti: not more than 3%

Ti is a carbide-forming element and is an effective element which improves the high temperature strength. Ti also has an effect for fixing C and thereby increasing the intergranular corrosion resistance. In order to ensure the said effects, the content of Ti is preferably set to not less than 0.005%. However, if the content of Ti exceeds 3%, marked deterioration of mechanical properties such as toughness and so on occurs. Therefore, if Ti is included, the content of Ti is set to not more than 3%. If Ti is included, the content of Ti is preferably 0.005 to 3% and more preferably 0.01 to 2%. Most preferably, the content of Ti is 0.05 to 1%.

Nb: not more than 1.5%

Nb is a carbide-forming element and is an effective element which improves the high temperature strength. Nb also has an effect for fixing C and thereby increasing the intergranular corrosion resistance. In order to ensure such effects, the content of Nb is preferably set to not less than 0.05%. However, if the content of Nb exceeds 1.5%, marked deterioration of mechanical properties such as toughness and so on occurs. Therefore, if Nb is comprised, the content of Nb is set to not more than 1.5%. If Nb is comprised, the content of Nb is preferably 0.05 to 1.5% and more preferably 0.05 to 1%. Further more preferably, the content of Nb is 0.05 to 0.6%.

Ta: not more than 8%

Ta is also a carbide-forming element and is effective in improving the high temperature strength. Ta also has an effect for fixing C and thereby increasing the intergranular corrosion resistance. In order to ensure these effects, the content of Ta is preferably set to not less than 0.01%. However, if the content of Ta exceeds 8%, marked deterioration of mechanical properties such as toughness and so on occurs. Therefore, if Ta is included, the content of Ta is set to not more than 8%. If Ta is included, the content of Ta is preferably 0.01 to 8% and more preferably 0.01 to 7%. Most preferably, the content of Ta is 0.05 to 6%.

V: not more than 1.5%

V is a carbide-forming element and is effective in improving the high temperature strength. V also has an effect for fixing C and thereby increasing the intergranular corrosion resistance. In order to ensure the said effects, the content of V is preferably set to not less than 0.02%. However, if the content of V exceeds 1.5%, marked deterioration of mechanical properties such as toughness and so on occurs. Therefore, if V is comprised, the content of V is set to not more than 1.5%. If V is comprised, the content of V is preferably 0.02 to 1.5% and more preferably 0.04 to 1%.

Zr: not more than 1%

Zr mainly contributes to grain boundary strengthening and brings about improvements in high temperature strength. In order to ensure the said effects, the content of Zr is preferably not less than 0.0005%. However, if the content of Zr exceeds 1%, deterioration of mechanical properties and/or weldability occurs. Therefore, if Zr is comprised, the content of Zr is set to not more than 1%. If Zr is comprised, the content of Zr is preferably 0.0005 to 1% and more preferably 0.01 to 0.8%. Further more preferably, the content of Zr is 0.02 to 0.5%.

Hf: not more than 1%

Hf also mainly contributes to grain boundary strengthening and brings about improvements in high temperature strength. In order to ensure the said effects, the content of Hf is preferably not less than 0.0005%. However, if the content of Hf exceeds 1%, deterioration of mechanical properties and/or weldability occurs. Therefore, if Hf is included, the content of Hf is set to not more than 1%. If Hf is included, the content of Hf is preferably 0.0005 to 1% and more preferably 0.01 to 0.8%. Further more preferably, the content of Hf is 0.02 to 0.5%.

B: not more than 0.03%

B exists in carbonitrides and promotes finely dispersed precipitation of carbonitrides during the use at high temperatures, and at the same time, B exists singly at grain boundaries and therefore strengthens grain boundaries and prevents grain boundary sliding. And thereby, B enhances the high temperature strength and improves the creep strength. In order to ensure the said effects, the content of B is preferably set to not less than 0.0005%. However, if the content of B exceeds 0.03%, deterioration of weldability occurs. Therefore, if B is comprised, the content of B is set to not more than 0.03%. If B is comprised, the content of B is preferably 0.0005 to 0.03% and more preferably 0.001 to 0.01%. Most preferably, the content of B is 0.001 to 0.005%.

Cu: not more than 3%

Cu stabilizes austenite and precipitates as the state of the fine Cu phase coherently with the austenitic mother phase during the use at high temperatures. That is to say, Cu has the effect of enhancing high temperature strength markedly. In order to ensure the above-mentioned effect, the content of Cu is preferably not less than 0.01%. However, when the content of Cu becomes excessive, in particular, when it exceeds 3%, deterioration of hot workability, weldability and creep ductility occurs. Therefore, when Cu is included, for example, for the purpose of stabilizing austenite in lieu of Ni from the raw material cost viewpoint and/or ensuring a higher high temperature strength, the content of Cu is set to not more than 3%. If Cu is included, the content of Cu is preferably 0.01 to 3%. The upper limit of the Cu content is more preferably 2% and further more preferably 0.9%.

Co: not more than 5%

Like Ni and Cu, Co stabilizes the austenitic microstructure and has the effect of enhancing the high temperature strength. In order to ensure the said effects, the content of Co is preferably not less than 0.05%. However, at a Co content level which exceeds 5%, the said effects of Co arrive at saturation levels and the economic efficiency only declines. Therefore, if Co is included, the content of Co is set to not more than 5%. If Co is included, the content of Co is preferably 0.05 to 5%.

The steels of the present invention can contain only one or a combination of two or more of the above-mentioned elements Mo, W, Ti, Nb, Ta, V, Zr, Hf, B, Cu and Co.

Each of Ca and Mg being elements of the second group, and if added, has the effect of improving the hot workability. In order to obtain this effect, the said elements may be added to the steels and thereby contained therein. In the following, the elements, which are in the second group, are described in detail.

Ca: not more than 0.05%

Ca has an effect of improving the hot workability. In order to ensure this effect, the content of Ca is preferably set to not less than 0.0005%. However, a Ca content which exceeds 0.05% causes a decrease in hot workability due to the formation of oxide type inclusions and also causes deterioration of ductility. Therefore, if Ca is included, the content of Ca is set to not more than 0.05%. If Ca is included, the content of Ca is preferably 0.0005 to 0.05% and more preferably 0.001 to 0.02%. Further more preferably, the content of Ca is 0.001 to 0.01%.

Mg: not more than 0.05%

Mg also has an effect of improving the hot workability of steels. In order to ensure this effect, the content of Mg is preferably set to not less than 0.0005%. However, a Mg content which exceeds 0.05% causes a decrease in hot workability due to the formation of oxide type inclusions and also causes deterioration of ductility. Therefore, if Mg is included, the content of Mg is set to not more than 0.05%. If Mg is included, the content of Mg is preferably 0.0005 to 0.05% and more preferably 0.001 to 0.02%. Most preferably, the content of Mg is 0.001 to 0.01%.

The steels of the present invention can contain only one or a combination of both of the above-mentioned elements Ca and Mg.

The value of $(Cr+1.5\times Si+2\times Nb+Ti+2\times P)/(Ni+0.31\times Mn+22\times C+14.2\times N+Cu+5\times P)$: less than 1.388

The austenitic stainless steel containing one element or two or more elements selected from the first group and/or the second group, in lieu of a part of Fe in the base metal and weld metal of the austenitic stainless steel welded joint according to the present invention (1), or in lieu of a part of Fe of the austenitic stainless steel welding material according to the present invention (3), if it has a value of "$(Cr+1.5\times Si+2\times Nb+Ti+2\times P)/(Ni+0.31\times Mn+22\times C+14.2\times N+Cu+5\times P)$" which is less than 1.388, namely satisfies the formula (2), can reliably and stably prevent the undergoing of the weld solidification cracking even when it shows the fully austenitic solidification to form a single phase of austenite.

From the reasons mentioned above, the austenitic stainless steel welded joint according to the present invention (2) and the austenite stainless steel welding material according to the present invention (4) are defined as the ones which contain one element or two or more elements selected from the above-mentioned first group and/or the second group in lieu of a part of Fe in the austenitic stainless steel welded joint according to the present invention (1) and the austenitic stainless steel welding material according to the present invention (3), respectively, and which further satisfy the said formula (2).

The austenitic stainless steel welded joints according to the present inventions (1) and (2) can be produced by various welding methods such as TIG welding, MIG welding and so on.

As for the welding material to be used in the production of the above-mentioned austenitic stainless steel welded joints, according to the welding method and the welding conditions, the one which has a chemical composition that can give the above-mentioned composition of the said weld metal may be selected.

In the case of the TIG welding method, the composition of the welding material may be substantially the same as the one of the weld metal. Therefore, for example, the austenitic stainless steel welding material according to the present invention (3) is preferably used as the welding material in order to produce the austenitic stainless steel welded joint according to the present invention (1). While the austenitic stainless steel welding material according to the present invention (4) is preferably used as the welding material in order to produce the austenitic stainless steel welded joint according to the present invention (2).

The following examples illustrate the present invention more specifically. These examples are, however, by no means limited to the scope of the present invention.

EXAMPLES

Austenitic stainless steels 1 to 9 and A to E, having the chemical compositions shown in Table 1, were melted using a high-frequency induction vacuum furnace and then cast to form ingots.

The steels 1 to 9 shown in Table 1 are steels whose chemical compositions fall within the range regulated by the present invention. On the other hand, the steels A to E are steels of comparative examples whose chemical compositions are out of the range regulated by the present invention.

TABLE 1

Chemical composition (% by mass); Balance: Fe and impurities

| Steel | C | Si | Mn | P | S | Cr | Ni | sol. Al | N | Nd | Ce | Cu | W | B | Nb | Ti | Ca | Mg | Value of formula |
|---|---|---|---|---|---|---|---|---|---|---|---|---|---|---|---|---|---|---|---|
| 1 | 0.10 | 0.28 | 0.80 | 0.10 | 0.001 | 18.39 | 15.34 | 0.023 | 0.007 | 0.51 | — | — | — | 0.0036 | — | — | — | — | 1.034 |
| 2 | 0.10 | 0.24 | 0.80 | 0.10 | 0.001 | 19.74 | 29.71 | 0.023 | 0.006 | 0.54 | — | — | — | — | — | — | — | — | 0.620 |
| 3 | 0.10 | 0.36 | 0.91 | 0.10 | 0.001 | 18.05 | 18.30 | 0.024 | 0.006 | 0.53 | — | — | — | — | — | — | 0.008 | — | 0.879 |

TABLE 1-continued

Chemical composition (% by mass); Balance: Fe and impurities

| Steel | C | Si | Mn | P | S | Cr | Ni | sol. Al | N | Nd | Ce | Cu | W | B | Nb | Ti | Ca | Mg | Value of formula |
|---|---|---|---|---|---|---|---|---|---|---|---|---|---|---|---|---|---|---|---|
| 4 | 0.10 | 0.22 | 0.80 | 0.09 | 0.001 | 17.96 | 17.11 | 0.024 | 0.006 | 0.56 | — | — | — | — | 0.20 | — | — | — | 0.939 |
| 5 | 0.09 | 0.16 | 1.47 | 0.10 | 0.001 | 18.01 | 16.03 | 0.026 | 0.006 | 0.48 | — | — | — | — | — | 0.20 | — | 0.006 | 0.979 |
| 6 | 0.10 | 0.19 | 0.84 | 0.11 | 0.001 | 18.11 | 15.21 | 0.024 | 0.005 | 0.55 | — | 2.94 | — | — | — | — | — | — | 0.877 |
| 7 | 0.10 | 0.27 | 0.78 | 0.10 | 0.001 | 18.08 | 15.16 | 0.022 | 0.006 | 0.33 | — | — | 1.6 | — | 0.19 | 0.19 | — | — | 1.059 |
| 8 | 0.10 | 0.31 | 0.77 | 0.11 | 0.002 | 17.85 | 15.02 | 0.024 | 0.009 | 0.50 | — | — | 1.7 | — | 0.19 | 0.19 | — | — | 1.053 |
| 9 | 0.11 | 0.21 | 0.82 | 0.10 | 0.001 | 18.25 | 15.22 | 0.020 | 0.001 | — | 0.48 | — | — | — | 0.20 | 0.26 | — | — | 1.055 |
| A | 0.10 | 0.21 | 0.80 | 0.10 | 0.001 | 17.94 | 15.11 | 0.019 | 0.006 | *0.13 | — | — | — | — | — | — | — | — | 1.017 |
| B | 0.10 | 0.20 | 0.82 | 0.29 | 0.001 | 18.19 | 10.28 | 0.018 | 0.006 | *0.035 | — | — | — | 0.0034 | 0.21 | 0.21 | — | — | 1.381 |
| C | 0.10 | 0.20 | 0.81 | 0.10 | 0.001 | 17.96 | 15.11 | 0.025 | 0.004 | *1.01 | — | — | — | — | — | — | — | — | 1.019 |
| D | 0.10 | 0.36 | 0.76 | 0.11 | 0.001 | 17.88 | 15.04 | 0.024 | 0.008 | *0.63 | — | — | 1.7 | — | 0.19 | 0.19 | — | — | 1.059 |
| E | 0.08 | 0.20 | 0.78 | 0.10 | 0.001 | 18.52 | 8.87 | 0.021 | 0.089 | *— | — | 2.95 | — | 0.0026 | 0.49 | — | — | — | 1.283 |

The values of formula for steels 2, A and C are the values of (Cr + 1.5 × Si + 2 × P)/(Ni + 0.31 × Mn + 22 × C + 14.2 × N + 5 × P); for other steels, values of (Cr + 1.5 × Si + 2 × Nb + Ti + 2 × P)/(Ni + 0.31 × Mn + 22 × C + 14.2 × N + Cu + 5 × P) are given.
The mark * indicates falling outside the conditions regulated by the present invention.

Each ingot obtained was hot-forged in the conventional manner and then subjected to a solution heat treatment at 1200° C. and then processed into restraint weld cracking test specimens with shape of V-groove (1.5 mm, 60°) at the butt end and having a thickness of 12 mm, a width of 50 mm and a length of 150 mm, and Trans-Varestraint test specimens having a thickness of 4 mm, a width of 100 mm and a length of 100 mm.

The steels C and D, which contained Nd in an amount exceeding the level defined by the present invention, were poor in hot workability and therefore allowed the occurrence of a number of cracks during hot forging; hence, test specimens could not be obtained. This is presumably because of the too early crystallization of a large amount of "NdP" due to the excessive content of Nd, leading to failure to obtain the effect of early disappearance of the liquid phase and conversely leading to an increased solidification cracking susceptibility, or because of both the failure of NdP to crystallize out and the segregation of Nd alone, leading to a markedly increased solid-liquid coexisting temperature range; hence to an increased solidification cracking susceptibility. The above-mentioned cracking in the step of hot forging is the solidification cracking caused by the melting of grain boundaries whose melting points are low, due to marked segregation of P at the grain boundaries. Thus, the said steels in question are considered to be very highly susceptible to solidification cracking without the need of subjecting them to any welding test; it is difficult to apply them as steels for practical use.

The thus-obtained restraint weld cracking test specimens, each made of austenitic stainless steels, were peripherally restraint-welded, and each butt site was subjected to a filler welding using a welding material (welding wire) with an outside diameter of 1.2 mm produced in advance from each austenitic stainless steel base metal by the TIG welding method under the following conditions: welding current 165 A, welding voltage 15 V, and welding speed 10 cm/min.

The measured results of the occurrence rate of the solidification cracking relative to the weld bead length of each restraint weld cracking test specimen are shown in Table 2. In the case of TIG welding, the chemical composition of the weld metal hardly undergoes dilution, hence remains the same as that of the base metal.

As mentioned above, no test specimens could be obtained from the steels C and D because of the occurrence of cracking during hot forging. Consequently, the restraint weld cracking test could not be conducted with them, and therefore in Table 2, the symbol "—" is given in the column of "Bead surface cracking ratio in restraint weld cracking test" thereof.

TABLE 2

| | | Weldability | | |
|---|---|---|---|---|
| Steel | Value of formula | Bead surface cracking ratio in restraint weld cracking test (%) | Maximum crack length in Trans-Varestraint test (mm) | Remark |
| 1 | 1.034 | 0 | 0.368 | Inventive |
| 2 | 0.620 | 0 | 0.980 | Examples |
| 3 | 0.879 | 0 | 0.607 | |
| 4 | 0.939 | 0 | 0.635 | |
| 5 | 0.979 | 0 | 0.448 | |
| 6 | 0.877 | 0 | 0.521 | |
| 7 | 1.059 | 0 | 0.889 | |
| 8 | 1.053 | 0 | 0.531 | |
| 9 | 1.055 | 0 | 0.664 | |
| *A | 1.017 | 0 | 1.58 | Comparative |
| *B | 1.381 | 100 | 3.96 | Examples |
| *C | 1.019 | — | — | |
| *D | 1.059 | — | — | |
| *E | 1.283 | 100 | 2.77 | |

The values of formula for steels 2, A and C are the values of (Cr + 1.5 × Si + 2 × P)/(Ni + 0.31 × Mn + 22 × C + 14.2 × N + 5 × P); for other steels, values of (Cr + 1.5 × Si + 2 × Nb + Ti + 2 × P)/(Ni + 0.3 × Mn + 22 × C + 14.2 × N + Cu + 5 × P) are given.
The symbol "—" for steels C and D means that no test specimens could be obtained therefrom because of the occurrence of cracking during hot forging due to low hot workability resulting from high Nd contents and that, therefore, the relevant test was not carried out.
The mark * indicates falling outside the conditions regulated by the present invention.

For more detailed evaluation of the susceptibility of each austenitic stainless steel to solidification cracking, a Trans-Varestraint test was carried out using the said Trans-Varestraint test specimens under the following conditions: welding current 100 A, welding voltage 15 V, welding speed 15 cm/min, added strain 2%; and the maximum crack length was measured.

In the case of a weld metal made of SUS 310S, which is an austenitic stainless steel showing the fully austenitic solidification, the maximum crack length evaluated by the Trans-Varestraint test is not longer than 1 mm. Therefore, an austenitic stainless steel showing a maximum crack length of not longer than 1 mm as evaluated by the said Trans-Varestraint test is considered to have excellent resistance against the weld solidification cracking.

The maximum crack lengths found in the said Trans-Varestraint test are also shown in Table 2.

As mentioned above, no test specimens could be obtained from the steels C and D because of the occurrence of cracking during hot forging. Therefore, since the Trans-Varestraint test could not be conducted with them, the symbol "–" is given in the relevant spaces under "Maximum crack length in Trans-Varestraint test" in Table 2.

From Table 2, it is evident that in the case of the steels 1 to 9 which fall within the conditions regulated by the present invention and contain REM at an appropriate level and further satisfy the formula (1) or formula (2), in spite of their having a high P content and showing the fully austenitic solidification, the maximum crack length in the Trans-Varestraint test was not longer than 1 mm in each of the steels and, in addition, no cracking occurred in the restraint weld cracking test; thus, the said steels 1 to 9 have excellent weldability.

On the contrary, the comparative example steels A, B and E falling out of the conditions regulated by the present invention were inferior in weldability.

That is to say, in the case of steel A, owing to the low Nd content of 0.13%, the crystallization of "NdP" could not be promoted. Therefore, while the bead surface cracking ratio was 0% in the restraint weld cracking test, the maximum Trans-Varestraint crack length was longer than 1 mm.

In the case of steel B, the Nd content of 0.035% is low and moreover the condition represented by the formula (2) is not satisfied. Therefore, the crystallization of "NdP" could not be promoted. Thus, in spite of its not being the fully austenitic solidification type, the maximum Trans-Varestraint crack length was longer than 1 mm, and the bead surface cracking ratio in the restraint weld cracking test was 100%, that is to say, cracks were observed all over the bead length.

In the case of steel E, the condition represented by the formula (2) is satisfied but it contains no Nd in spite of its high P content. Therefore, its susceptibility to the weld solidification cracking was very high; the maximum Trans-Varestraint crack length was longer than 1 mm, and the bead surface cracking ratio in the restraint weld cracking test was 100%, that is to say, cracks were observed all over the bead length.

As already mentioned, the steels C and D deteriorated in hot workability since they contain Nd at excessive levels exceeding the value regulated by the present invention. This is presumably because of a very early crystallization of a large amount of "NdP" due to the excessive content of Nd, leading to failure to obtain the effect of early disappearance of the liquid phase and conversely leading to an increased solidification cracking susceptibility, or because of both the failure of NdP to crystallize out and the segregation of Nd alone, which leads to a markedly increase in the solid-liquid coexisting temperature range, hence to increased solidification cracking susceptibility; it is difficult to apply them as steels for practical use.

INDUSTRIAL APPLICABILITY

The austenitic stainless steel welded joints made of the base metal and weld metal according to the present invention, in spite of having a high P content and showing the fully austenitic solidification, have excellent resistance to the weld solidification cracking and can be widely used in such fields where a welding fabrication is required. The austenitic stainless steel welding materials of the present invention are best suited for producing the above-mentioned austenitic stainless steel welded joints.

What is claimed is:

1. An austenitic Fe—Ni—Cr alloy welded joint, whose base metal and weld metal each comprises, by mass percent, C: not more than 0.3%, Si: not more than 2%, Mn: 0.01 to 3.0%, P: more than 0.04% to not more than 0.3%, S: not more than 0.03%, Cr: 12 to 30%, Ni: 6 to 55%, rare earth metal(s): 0.51 to 0.6%, sol. Al: 0.001 to 3% and N: not more than 0.3%, with the balance being Fe and impurities, and the following formula (1) is satisfied:

$$(Cr+1.5\times Si+2\times P)/(Ni+0.31\times Mn+22\times C+14.2\times N+5\times P) < 1.388 \quad (1),$$

wherein each element symbol in the formula (1) represents the content by mass percent of the element concerned.

2. The austenitic Fe—Ni—Cr alloy welded joint according to claim 1, whose base metal and weld metal each further contains, by mass percent, one element or two or more elements selected from the first group and/or the second group given below in lieu of a part of Fe and, further, the following formula (2) is satisfied:

$$(Cr+1.5\times Si+2\times Nb+Ti+2\times P)/(Ni+0.31\times Mn+22\times C+14.2\times N+Cu+5\times P)<1.388 \quad (2),$$

wherein each element symbol in the formula (2) represents the content by mass percent of the element concerned:
   first group: one or two or more of Mo: not more than 5%, W: not more than 10%, provided that Mo+(W/2): not more than 5%, Ti: not more than 3%, Nb: not more than 1.5%, Ta: not more than 8%, V: not more than 1.5%, Zr: not more than 1%, Hf: not more than 1%, B: not more than 0.03%, Cu: not more than 3% and Co: more than 5%; and
   second group: one or both of Ca: not more than 0.05% and Mg: not more than 0.05%.

3. An austenitic Fe—Ni—Cr alloy welding material, which comprises, by mass percent, C: not more than 0.3%, Si: not more than 2%, Mn: 0.01 to 3.0%, P: more than 0.04% to not more than 0.3%, S: not more than 0.03%, Cr: 12 to 30%, Ni: 6 to 55%, rare earth metal(s): 0.51 to 0.6%, sol. Al: 0.001 to 3% and N: not more than 0.3%, with the balance being Fe and impurities, and the following formula (1) is satisfied:

$$(Cr+1.5\times Si+2\times P)/(Ni+0.31\times Mn+22\times C+14.2\times N+5\times P) < 1.388 \quad (1),$$

wherein each element symbol in the formula (1) represents the content by mass percent of the element concerned.

4. The austenitic stainless steel Fe—Ni—Cr alloy welding material according to claim 3, which further comprises, by mass percent, one element or two or more elements selected from the first group and/or the second group given below in lieu of a part of Fe and, further, the following formula (2) is satisfied:

$$(Cr+1.5\times Si+2\times Nb+Ti+2\times P)/(Ni+0.31\times Mn+22\times C+14.2\times N+Cu+5\times P)<1.388 \quad (2),$$

wherein each element symbol in the formula (2) represents the content by mass percent of the element concerned:
   first group: one or two or more of Mo: not more than 5%, W: not more than 10%, provided that Mo+(W/2): not more than 5%, Ti: not more than 3%, Nb: not more than 1.5%, Ta: not more than 8%, V: not more than 1.5%, Zr: not more than 1%, Hf: not more than 1%, B: not more than 0.03%, Cu: not more than 3% and Co: not more than 5%; and
   second group: one or both of Ca: not more than 0.05% and Mg: not more than 0.05%.

* * * * *